July 14, 1959  S. J. FUCHS  2,894,409
SCREW THREADS AND GEAR TEETH
Filed March 27, 1958  2 Sheets-Sheet 1

INVENTOR.
Samuel J. Fuchs
BY Emanuel Scheyer
his Attorney

Inventor
Samuel J. Fuchs
By Emanuel Scheyer
his Attorney

United States Patent Office 2,894,409
Patented July 14, 1959

2,894,409

SCREW THREADS AND GEAR TEETH

Samuel J. Fuchs, New York, N.Y.

Application March 27, 1958, Serial No. 724,388

8 Claims. (Cl. 74—457)

This invention relates to relative movable pressure transmitting elements as screw threads and gear teeth. While superficially a screw thread and a gear tooth appear to be unrelated, actually they are species of a generic element and act substantially in the same manner.

A screw thread is a pressure transmitting element adapted to be in engagement with a mating screw thread or pressure transmitting element, the relative rotation of the threads inducing them to exert mutual pressure for the driving of one by the other.

Similarly a gear tooth is a pressure transmitting element adapted to be in engagement with a mating gear tooth or pressure transmitting element, the relative rotation of the teeth inducing them to exert mutual pressure for the driving of one by the other. A rack tooth can be considered a gear tooth because a rack is a gear having an infinite radius. Where consistent with the context, it is to be understood where the term gear is used in the specification and the claims it is to include the idea of a rack.

The conventional thread or gear tooth is subject to accentuated tensile stress in the fillet near the root of the thread or gear tooth. This stress renders the thread or tooth subject to breakage, especially in fatigue as the result of repeated applications of the load.

The conventional thread or tooth is subject to cantilever bending and to additional or secondary stresses in tension because of the stubbiness or shortness of the cantilever. A thread or tooth is a projection from a base body, said thread and tooth having two oppositely disposed flanks topped by a crest. When relative rotation of the conventional thread or conventional tooth is effected with its mating element, pressure is induced on the flank. In the proposed thread or tooth, which can be considered as pressure transmitting elements, when relative rotation of the thread or tooth is effected with its mating element, pressure is induced on the crest, substantially eliminating cantilever action with its consequent tension and the side effects in tension noted above.

A bolt, when functioning, is subject to tension as its principal stress. This tension is added to by the secondary tensile stress at the root of a conventional thread. Further, it is well known that notching or grooving a tension member induces failure far out of proportion to the tensile stress especially when subject to fatigue.

The load to which a thread is subjected is the resultant of the axial load carried by the bolt or nut and the tension or bursting stress induced in the nut. This resultant load, which is applied to the flank in the conventional thread, induces bending in the thread with resultant tension at the base of the thread. With the thread of the present invention, the load is applied to the crest of the thread producing thereby mainly compression in the base of the thread.

With conventional gear teeth, the teeth of mating gears are so formed relatively to each other that there is rolling contact between the flanks of the mating teeth, for transmitting pressure between them. With the teeth of the present invention this rolling contact occurs on the crests of mating teeth when they have relative rotation in one direction, that is the power driving or working direction. With relative rotation in the opposite or return direction, the flanks of mating teeth engage. In many industrial applications of gearing it is only necessary to transmit the power in one direction of rotation. The return rotation is principally for the purpose of setting the gears and the apparatus operated by them for their next power driving rotation. Accordingly, during the return rotation, the teeth are not subject to excessive pressure. In this case, flank engagement is suitable.

It is an object of the present invention so to form and tilt the thread or tooth that it takes its load, so to speak, head-on, said load being resisted mainly by compression in the thread or tooth.

Other objects and advantages will become apparent upon further study of the description and drawings in which.

Figure 1:
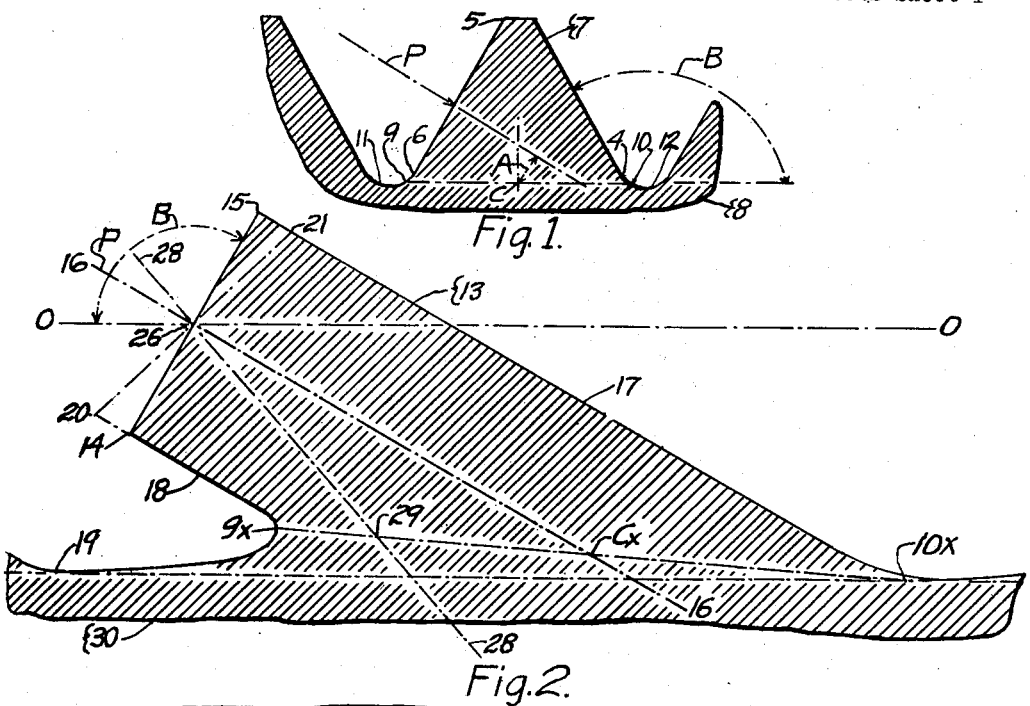
Fig. 1 is a section of a conventional screwthread with a portion of its bolt, upon which is indicated the force acting thereupon.

When a bolt 8 is subjected to tension in holding pieces together by coacting with a nut, not shown, screwed up upon it, the thread load P on the conventional thread 7 shown diagrammatically in Fig. 1, is the resultant of the pull or axial load on the bolt 8 and the tension or bursting stress induced in the nut. The resultant load P is normal to the thread bearing surface or flank 5—6. The most widely used conventional threads have their flanks at an angle of approximately 120 degrees measured outwardly from them with the axis of the bolt, said angle being indicated by the symbol B on the drawing.

Load P causes cantilever bending of thread 7, which has been found to be at a maximum approximately along a base 9—10, with the result that maximum tension is produced at point 9. The fact that the line of action of load P passes at a distance A from the center point C of the base 9—10, produces the cantilever effect. Point 9 is located on the thread fillet 11 at an angular offset of 30 degrees from the tangent point 6. Similarly, the point 10 is located on the thread fillet 12 at an angular offset approximately of 30 degrees from the tangent point 4.

The tensile stress, because of cantilever bending, at point 9 is further accentuated by the fact that the cantilever is relatively short or stubby, introducing a secondary tensile stress known as the proximity effect. Another component effect is a stress concentration factor which multiplies or accentuates locally at 9, the tensions of the cantilever bending and of the proximity effect. Still another multiplier is accounted for by the variable distribution of the load along the engaged surface 5—6 of the nut and bolt, that is unequal bearing on said surface. Another and important factor in producing a concentration of tensile stress is the groove or notch effect produced at point 9. It is well known in structural engineering that a tension member often fails at the groove even if the overall tension in the member is not excessive.

The conditions of tensile stress at point 10 correspond to those at point 9 except that they are neutralized at point 10 by the compressive stress normally occurring from the cantilever bending of the thread.

Figure 2:
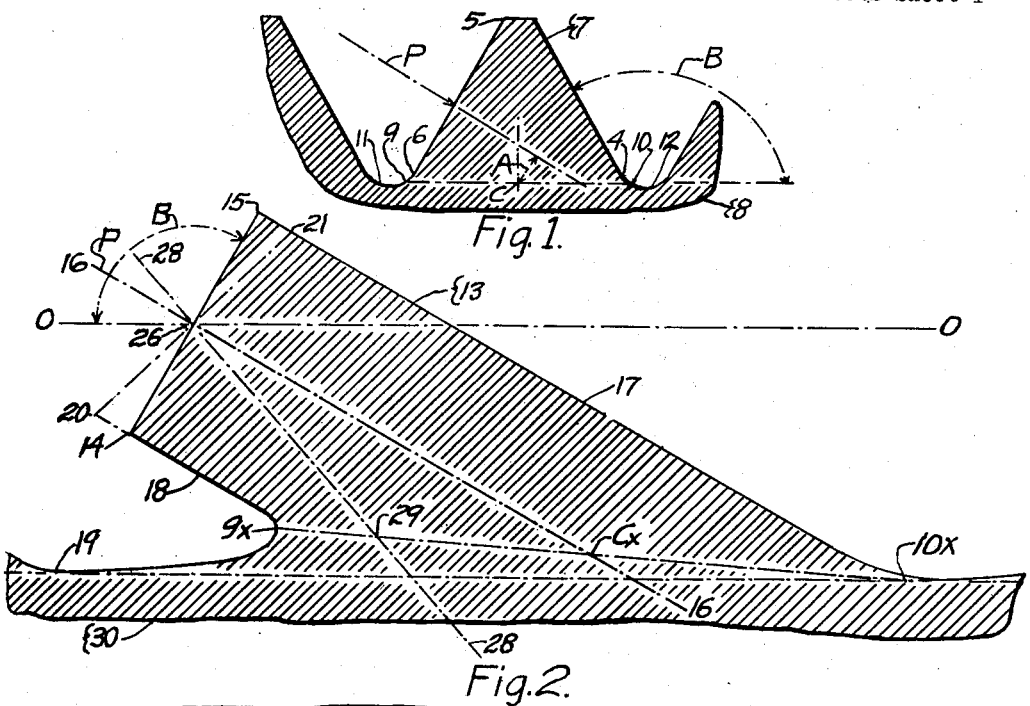
Fig. 2 is a partial section of a bolt having the thread of the present invention upon which is indicated the force acting thereupon.

The thread 13, Fig. 2, of the present invention is designed to reduce or eliminate substantially the cantilever tension and the secondary tensions and multipliers occurring in a conventional thread.

As seen in Fig. 2, the load P, to be carried by the thread 13, corresponds to the load P in Fig. 1. This is true, however, only when the angle B of crest 14—15 is the same as angle B of the conventional flank 5—6. The reference line 0—0, Fig. 2, is parallel to the longitudinal axis of the bolt 30.

It is to be noted that in Fig. 2, the load P bears against the crest 14—15 of the thread, whereas with the conventional thread 7 of Fig. 1, the load bears against the flank 5—6.

The line of action 16—16 of thread load P intersects line 9x—10x, which can be considered as approximately the base of thread 13 at its midpoint Cx approximately when the crest 14—15 is at right angles to flanks 17 and 18. Under these conditions there is substantially no cantilever bending of thread 13. The principal stress along base 9x—10x is one of compression. Further, the proximity stress, noted hereinbefore is reduced at point 9x and tends to compression. Point 9x corresponds to point 9 in Fig. 1.

As noted before in connection with the conventional thread 7 of Fig. 1, a serious concentration or acentuation of tensile stress occurs at the point 9 because of the notch or groove effect. With new thread 13, there is more room for the fillet between point 19 and point 9x to merge with the flank 18 of the thread than with the conventional thread, resulting in a reduction of the notch effect. The reduction is even greater at point 10x because of the flatness of the fillet.

All the secondary tensile effects of the conventional thread are reduced in magnitude or even annuled by the compression induced along base 9x—10x of the new thread.

Actually, the stress at point 9x can be made as compressive as desired. By making angle 14, 26, 20 an acute angle, the load received by new crest 20—21, shown dotted, acts along line 28—28 which is perpendicular to said new crest. Because line of action 28—28 intersects the base 9x—10x eccentrically at point 29, which is off-set form its center point Cx, greater compression results at point 9x than if the line of action bisected the base. Whenever it is necessary to overcome the concentration of tensile stress because of a severe notch condition, the increased compression, noted above, can be resorted to.

Throughout the description thus far, the screw thread has been noted as applied to the bolt. It is to be understood that it is equally applicable to the nut. However, it is generally known from experience with conventional nuts and bolts, that the accentuated fillet stress that prevails in a bolt is higher than in the corresponding nut of standard manufacture. Accordingly, it may be sufficient, as desired, to provide nuts with conventional threads in conjunction with bolts having the proposed thread.

Figure 3:
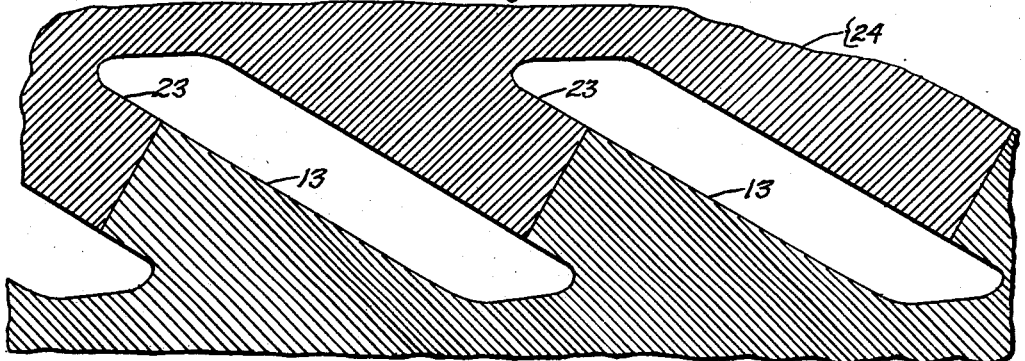
Fig. 3 is a partial section of a bolt and its engaging nut, both having the new thread.

A portion of a nut 24, is seen in Fig. 3 having the proposed threads 23 in engagement with the proposed threads 13 of bolt 30 shown in part.

Figure 4:
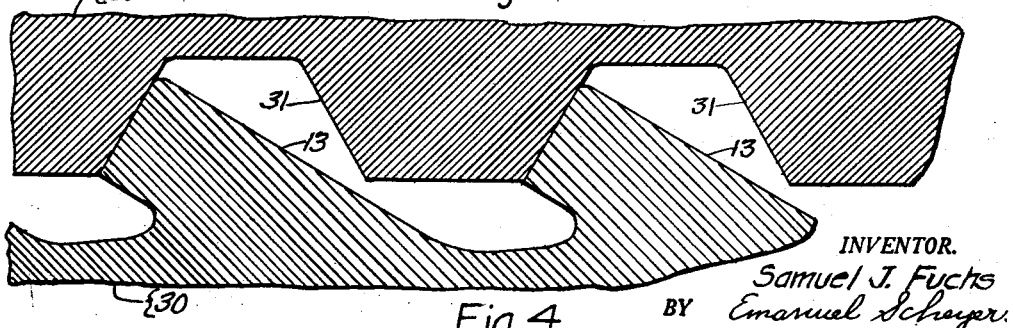
Fig. 4 is a partial section of a bolt with the new thread engaged by a nut with conventional thread.

In Fig. 4, a part of a standard nut 25 with standard threads 31 is shown in engagement with the proposed threads 13 of bolt 30 shown in part.

In some of the claims for simplicity, the bolt only is specified. Where consistent with the context, it is to be understood that it could mean the nut as well. The term "bolt" is intended to include the meaning of a shaft of a screw fastening. The term "nut" is intended to include the meaning of a plate or sleeve.

In Fig. 1, which shows in elevation a tooth 31 of a conventional gear 32, the load or pressure P' with the tooth of a mating gear, not shown, is applied by rolling contact along the flank 63—34 and normal thereto at the contact. For simplicity in the discusion of Fig. 5 and of those that relate to gears, reference will be made to points shown on the elevation of the tooth. Because the tooth has thickness, it is to be understood that said points actually represent the ends of lines or traces of planes extending for the thickness of the tooth.

The base 63—35 of the tooth 31 can be considered as extending part way up the fillets 36 and 37. When the load P', which travels from point 33 to point 34 reaches toward point 34 at the end of crest 34—38, tooth 31 is subject to cantilever bending approximately at maximum along its base 63—35. The cantilever bending induces tension in the vicinity of point 63. A secondary stress, proximity stress, is experienced at point 63 in an analogous manner to the proximity effect previously considered in the analysis of the thread 7, Fig. 1. Similarly a stress concentration or multiplier is experienced at point 53.

The construction of the new gear tooth 39 follows the same objectives as previously stated for the new thread; namely, the substantial elimination of stress because of cantilever bending, of secondary stress because of proximity, and of stress concentration effects, all of which occur in conventional gear teeth. The gear tooth of the invention is intended for full power or working load associated only with a forward rotational sense, and for a smaller or secondary load in the reverse rotational sense.

Figure 5:
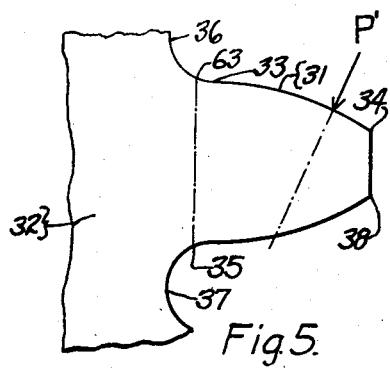
Fig. 5 is an elevation of a conventional gear tooth with a portion of the gear rim upon which is indicated the force acting thereupon.
Figure 6:
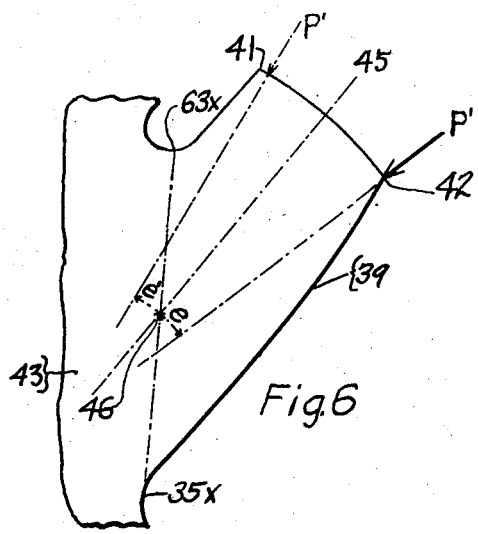
Fig. 6 is a partial elevation of a gear with the tooth of the present invention, upon which is indicated the force acting thereupon during power driving.
Figure 7:
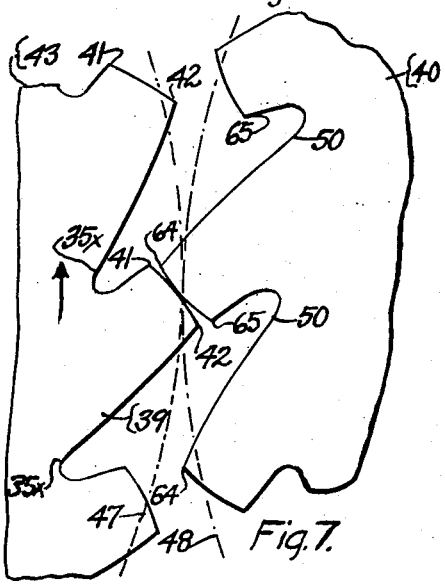
Fig. 7 is a partial elevation of a gear and its mate, with teeth of the present invention, in heavy driving or power engagement.

It is to be noted that under power or working load P', Fig. 6, the tooth 39 is adapted for gearing engagement with a mating gear 40, Fig. 7, rolling along the crest 41—42, instead of along the flank 63—34 of the conventional tooth 31 of Fig. 5. When rotated in the direction of the arrow, gear 43, Fig. 7 is power driving.

The crest 41—42, Fig. 6, corresponds in contour to a conventional profile developed for conjugate gearing action with a mating gear 40, Fig. 7. The tooth load is exerted normal to said profile successively at all points between limit positions for the load P' near point 41 and for the load P' near point 42. The base of tooth 39 can be considered as extending along the line 63x—35x. The line 45—46 through the midpoint of the crest 41—42 and the midpoint 46 of the base 63x—35x can be considered as the axis of the tooth. It is to be noted that the axis 45—46 makes an oblique angle with base 63x—35x.

Although the tooth form is essentially quadrilateral, the tooth may be rounded or cut off (not shown) at its tips 41 and 42 and undercut at its roots or fillets in accordance with standardized methods for clearance with mating gear teeth.

The eccentricity of the tooth load P' with respect to the midpoint 46 of base 63x—35x can range from e' for the dotted position of load P' near one end of crest 41—42, to e for the solid position of load P' at the other end of the crest. From this it can be noted, that the line of action of the load P' always intersects the base 63x—35x in a limited range near the base midpoint 46, so that the eccentricity, bending moment and stress are correspondingly limited. In contrast to the new gear tooth, the line of action in the conventional tooth falls outside of the base, with eccentricity, bending moment and stress correspondingly greater. Further, the proximity effect is absent from the flank of the new tooth because the load is applied to the crest thereof. The stress in the new gear tooth is substantially simple compression without other side and secondary stress effects.

The angle crest 41—42 makes with base 63x—35x can be varied to control the distribution of stress on said base as was explained for crest 20—21 of Fig. 2.

The foregoing analysis of the new tooth has been concerned with rotation (see arrow Fig. 7) associated with the driving or power load. With power rotation, gear 43 doing the driving, contact is made with a crest 64—65 of mating gear 40 by a crest 41—42 of gear 43. Arcs 47 and 48, Fig. 7, denote the pitch circles of gears 43 and 40 respectively, the mutual rolling action of which corresponds to the rotation of said gears.

Figure 8:
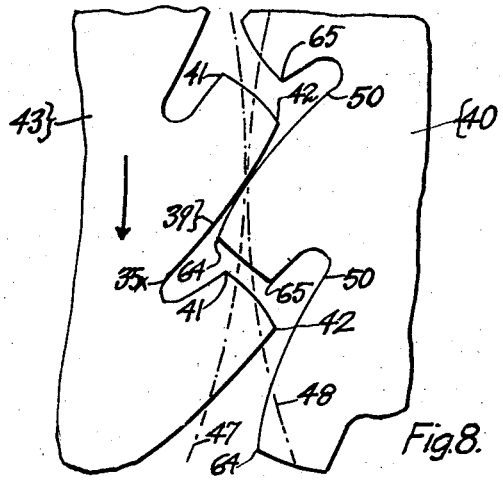
Fig. 8 is a partial elevation of a gear and its mate with teeth of the present invention in return or light driving engagement.

In light driving by gear 43, said gear rotates in the direction of the arrow, Fig. 8, which is the reverse of the rotation for power driving as indicated by the arrow in Fig. 7. In power driving, the crests engage, Fig. 7, but in light or return driving, contact is made along a flank 35x—42 of gear 43, with a flank 64—50 of gear 40. Pitch circles 47 and 48, Fig. 8, correspond in their rolling action to the reverse rotation of their respective gears. The stress behavior in reverse rotation is subject to the disadvantages previously described for conventional gears. However, as previously noted, the new gear is intended only for minor loading in reverse rotation, a common industrial condition.

Figure 9:
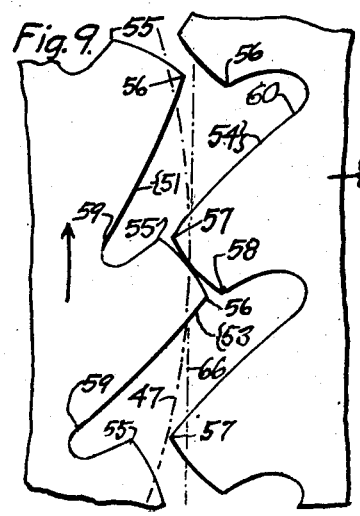
Fig. 9 is a partial elevation of a gear and a mating rack with teeth of the present invention in heavy driving or power engagement.
Figure 10:
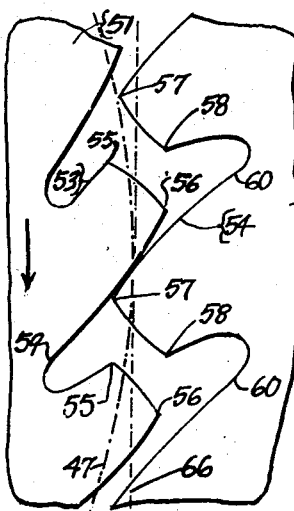
Fig. 10 is a partial elevation of a gear and a mating rack with teeth of the present invention in return or light driving engagement.

In Fig. 9 is shown a gear 51 driving a rack 52. During driving for power, said gear rotating in the direction of the arrow, a crest 55—56 of gear tooth 53 presses against a crest 57—58 of rack tooth 54. During return or light driving by gear 51, direction of arrow Fig. 10, a flank 56—59 of gear tooth 53 presses against a flank 57—60 of rack tooth 54. Arc 47 and line 66 denote respectively the pitch circle of gear 53 and the pitch line of rack 52, the mutual moving contact of which corresponding to their relative motion.

The description above given for the behavior under load of gear teeth applies essentially to types of gears having discrete teeth. It also applies to thread types of gears having cross sectional elements of tooth form.

I claim:

1. In a pair of mating pressure transmitting elements mounted for relative rotation one element being adapted to drive the other, a projection from the main body of at least one of the elements comprising four sides, considering the base of the projection substantially where it joins the main body as a side, the others of said sides comprising two flank sides opposite each other extending outwardly from the main body at the opposite ends of the base, one of said flank sides being shorter than the other, and a crest side topping the flank sides opposite the base, said crest side being locatable with respect to the mating element to receive the pressure exerted between the elements substantially normal to it when one element drives the other, and being inclined to the base so that the center line of said pressure taken in a plane normal to the edge between the crest and said short side passes through the projection to intersect the base.

2. In a pair of mating pressure transmitting elements, as claimed in claim 1, in which the crest side is locatable with respect to the mating element to receive the pressure exerted between the elements substantially normal to it and inclined to the base so that the center line of the pressure taken in a plane normal to the edge between the crest and the short side passes through the projection to intersect the base at a distance from the short side substantially at most one-half the length of the base.

3. In a pair of mating pressure transmitting elements mounted for relative rotation, one element being adapted to drive the other, a projection from the main body of each of the elements, comprising four sides, considering the base of the projection substantially where it joins the main body as a side, the others of said sides comprising two flank sides opposite each other extending outwardly from the main body at the opposite ends of the base, one of said flank sides being shorter than the other, and a crest side topping the flank sides of each projection opposite their respective bases, the crest sides being locatable to receive the pressure exerted between the elements substantially normal to them when one element drives the other, each crest side being inclined to its respective base so that the center line of said pressure taken in a plane normal to the edges between the crests and said short sides passes through the projections to intersect their respective bases.

4. In a pair of mating pressure transmitting elements mounted for relative rotation, one element being adapted to drive the other, as claimed in claim 1, in which one of the elements is a bolt and the other is a nut, the projection from the main body of the bolt being a screw thread adapted to receive on its crest the pressure from the nut.

5. In a pair of mating pressure transmitting elements mounted for relative rotation, one element being adapted to drive the other, as claimed in claim 3, in which one of the elements is a bolt and the other is a nut, the projection from the main body of the bolt being a screw thread, and the projection from the main body of the nut being a screw thread, the crest sides of said threads being located to engage each other to receive the pressure between them when one element is given rotation with respect to the other.

6. In a pair of mating pressure transmitting elements mounted for relative rotation, one element being adapted to drive the other as claimed in claim 3, in which said rotation in one direction is for power driving, and in which one element is a gear and the other a rack, the projection from the main body of each element being a tooth, the crest sides of the teeth being located to engage each other to receive the pressure when the elements are caused to have relative rotation with respect to each other in the direction for power driving, one of the flank sides of the tooth of each of the elements being formed and located to engage each other for said rotation in the opposite direction.

7. In a pair of mating pressure transmitting elements mounted for relative rotation, one element being adapted to drive the other, as claimed in claim 3, in which both elements are gears, the projection from the main body of each gear being a tooth, the crest sides of said gear teeth being located to engage each other to receive the pressure when one gear is given rotation with respect to the other.

8. In a pair of mating pressure transmitting elements mounted for relative rotation, one element being adapted to drive the other, as claimed in claim 3, in which said rotation in one direction is for power driving, and in which both elements are gears, the projecton from the main body of each gear being a tooth, the crest sides of said gear teeth being located to engage each other to receive the pressure when one gear is given rotation with respect to the other in the direction for power driving, one of said flank sides of the tooth of each of the respective gears being formed and located to engage each other for rotation in the opposite direction.

References Cited in the file of this patent

UNITED STATES PATENTS

| 45,779 | Werni | Jan. 3, 1865 |
| 313,552 | Sweet | Mar. 10, 1885 |
| 2,473,752 | Johnson | June 21, 1949 |

FOREIGN PATENTS

| 1,574 | Great Britain | June 30, 1853 |